June 3, 1930.   O. JOHNSON   1,761,128
MECHANICAL MOVEMENT
Filed Jan. 24, 1928
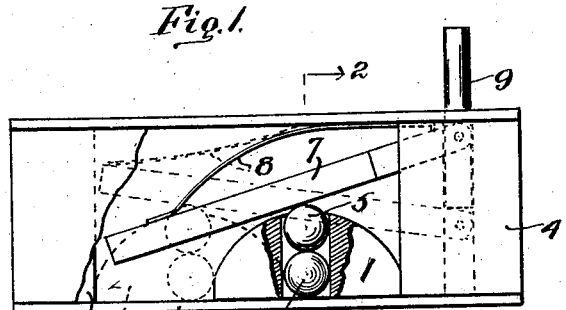
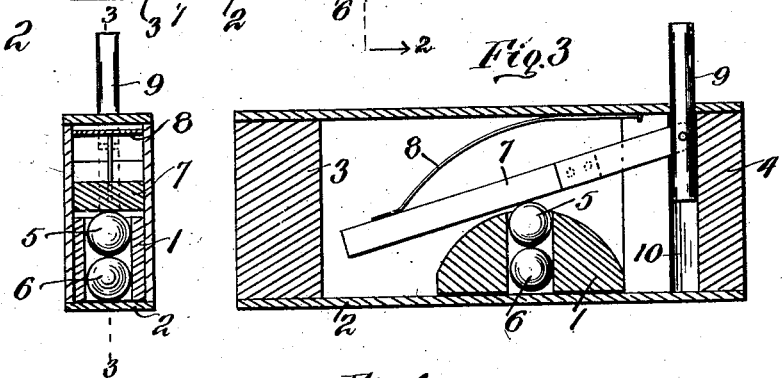
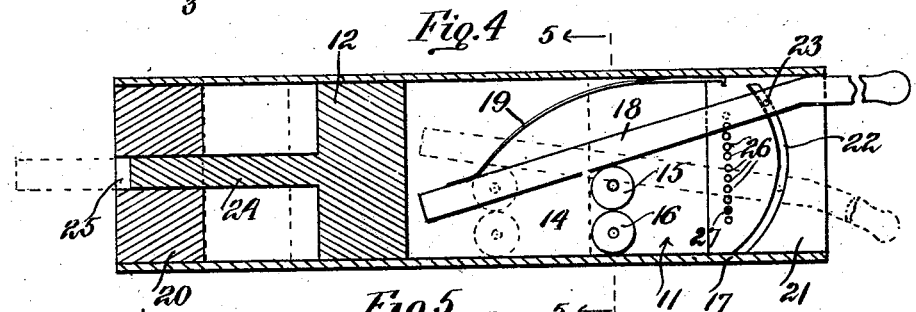
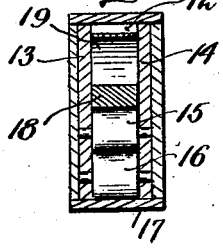
INVENTOR.
Oscar Johnson
BY
ATTORNEY Patented June 3, 1930

1,761,128

UNITED STATES PATENT OFFICE

OSCAR JOHNSON, OF GLENDALE, CALIFORNIA

MECHANICAL MOVEMENT

Application filed January 24, 1928. Serial No. 249,076.

My invention relates to a force generating means for producing, regulating or controlling power for any purpose and it has especial reference to a novel arrangement of elements for producing a simple mechanical movement the force of which may be utilized to impart motion to any mechanical element or combinations.

The object of the invention is to provide a means of the general nature stated which embodies few parts, is simple in construction, is positive in action, is easy of operation, and is cheap to manufacture.

In the accompanying drawings, I have illustrated my invention in one of the forms in which it may be embodied, it being understood that the representation is exemplary merely, and that the invention is susceptible to infinite modifications, and structural changes without departing from the spirit of the invention.

In the drawing,

Fig. 1 is a side view showing my invention.

Fig. 2 is a sectional elevation, the section occurring on line 2—2— Fig. 1, looking in the direction of the arrow.

Fig. 3 is a section on line 3—3—Fig. 2.

Fig. 4 is a sectional elevation of a slightly modified form, and

Fig. 5 is a section on line 5—5—Fig. 4, looking in the direction of the arrow.

In a generic sense, the invention consists of an element arranged to be driven and containing contacting anti-friction units, a driving element fulcrumed upon one of said units and tiltable with respect thereto to move said driven element to and fro, and means to limit the travel of said driven element.

In a more specific sense, the invention is shown as comprising an element 1 arranged to be driven, along a suitable support 2, which is provided with stop means 3 and for limiting the travel of said element 1. The element 1 is provided with contacting anti-friction units 5 and 6, the axes of which are in vertical alinement, and the unit 6 arranged in contact with the support 2, upon which it is arranged to move to and fro between the limiting members 3 and 4.

One of the mutually contacting anti-friction units, to wit, 5 constitutes a fulcrum for a lever 7 that is arranged for oscillable movement upon said fulcrum unit 5, pressure means 8 and 9 being applied to said lever 7 to force said element 1 to move to and fro upon said support 2 and against the limiting member 3 and 4 when said lever is operated upon and at an angle to both sides of the vertical central plane of the fulcrum unit 5.

In Figure 1, 2, and 3, I have shown the operating means for the element 1 as comprising the lever 7, upon one end of which is imposed a pressure means, as a spring 8, and at the other end of which is provided a handle 9 or other desirable means, by the depressure of which against the tension of said spring 8, the lever 7 is operated in one direction with respect to the fulcrum unit 5, the spring 8 operating said lever in another direction when pressure is removed from said handle 9. The lever 7, as shown, is pivotally connected to said handle 9, which is guided in an accommodating slot or groove 10 provided in the limiting member 4. Thus by the oscillation of said lever 7, the fulcrum unit 5 is caused to revolve, imparting its revolutionary motion to the unit 6 which contacts the support 2, and thereby the element 1 is propelled to and fro.

The mechanical movement described may be employed in a variety of ways for producing or controlling force or power. An instance of the adaptation of the device to the utilization of the force produced by the propulsion of the element is illustrated in Figs. 4 and 5. The element 11 is there shown as comprising a head member 12 having a pair of spaced plates 13 and 14, preferably loosely journaling between them a plurality of superposed anti-friction contacting units 15 and 16, which in this instance comprise wheels or rollers. The unit 16 is arranged for rolling contact with the support 17, and the unit 15 constitutes a fulcrum for a lever 18 on which the unit is arranged to roll when the lever is moved to one side or the other of the vertical central plane through the anti-friction units 15 and 16. Means for imposing a pressure upon said lever 18 to propel the element 11 to and fro upon the support 17 is provided in the form of a resilient spring 19, but it will be understood that other means of superimposing pressure upon said lever 18 may be provided without involving any departure from the spirit of the invention.

Means for limiting the forward and backward travel of said element 11 upon said support 17 are provided by members 20 and 21, the member 21 being provided with an arcuate groove 22 in which is arranged to travel a pin 23 provided on said lever 18, whereby one end of said lever 18 during the oscillation thereof is caused to move in the path of an arc while the other end thereof is caused to move in a rectilinear line. The purpose of this provision is to maintain the pressure of said lever 18 always directly in line with the central axis of the fulcrum 15 and to reduce to a minimum any frictional movement of the lever relative to the fulcrum unit 15. This is especially necessary where heavy pressure is exercised upon the lever.

The head member 12, which constitutes preferably an integral part of the element 11 is provided with an extension 24, which normally is disposed within an opening 25 in the limiting member 20. Thus, when the lever 18 is depressed and caused to rotate about the fulcrum unit 15 and to one side of the vertical central plane thereof, the element 11 is propelled forward against the limiting member 20, and the extension 24 is projected beyond said member 20, as shown in dotted lines Fig. 4.

Upon removal of the pressure from one end of said lever 18, the spring 19 operates to rotate the lever about said fulcrum 15 to the other side of the central vertical plane thereof, thereby causing the element 11 to be moved backward and the extension 24 to be retracted.

Means for limiting the inclination of the lever 18 relative to the vertical central plane of the fulcrum 15, and thereby regulating the speed of travel of the element 11 and the force incident thereto, may be provided in a variety of ways or by any number of devices.

One instance of an effective means for so limiting the angularity of the lever 18 is illustrated in Fig. 4 and comprises a plurality of holes 26 for the reception of pins or stop members 27, which are arranged to be disposed within the path of travel of the lever 18 and which confine the operation of said lever to definite limits in accordance with the amount of force that it is desired to produce.

It will be obvious that the force produced by the reciprocation of said element may be employed in a number of ways to produce or control mechanisms, and it will also be apparent that the device as represented and described is merely an exemplification of a form of embodiment of the invention, the essence of which is related in the accompanying claims.

What I claim, is:

1. A support, an element adapted to be driven to and fro on said support and having anti-friction means for rolling engagement with said support, anti-friction means in engagement with said first named anti-friction means, and a lever arranged to fulcrum upon said last named anti-friction means thereby to propel said element to and fro upon said support.

2. A support, an element adapted to be driven to and fro on said support, and having anti-friction means for rolling engagement with said support, anti-friction means superposed on said first-named anti-friction means, and a lever having rolling engagement with and fulcruming on said last named anti-friction means to propel said element to and fro upon said support.

3. A mechanical movement comprising a thrust member having centrally thereof a plurality of superposed revoluble units, a support for said thrust member, an inclined plane in engagement with one of said revoluble units, means to vary the inclination of said plane to impel said member forward and backward and means to limit the travel of said member.

4. A mechanical movement comprising an element arranged to be driven, a support for same, a plurality of contacting revoluble units in said element, a plane in contact with one of said units and arranged for inclination relatively thereto, to propel said element forward and backward, and means to limit the degree of inclination of said plane relative to said revoluble unit to regulate the speed of travel of said element.

5. A mechanical movement comprising an element arranged to be driven, a support for same, anti-friction means in said element, a plane in contact with said anti-friction means and arranged for inclination relatively thereto to propel said element to and fro upon said support and means to limit the degree of inclination of said plane relative to said anti-friction means to regulate the speed of movement of said element.

6. A mechanical movement comprising a support, a driven element on said support, a plurality of anti-friction means associated with said driven element, and means for exerting pressure on one of said anti-friction means and laterally of the central plane therethrough to cause the other of said anti-friction means to reciprocate said driven element.

7. A mechanical movement comprising a support, a thrust member thereon, a lever arranged to fulcrum upon said thrust member thereby a reciprocate same upon said support, and yielding means acting upon said lever to maintain same in contact with said thrust member.

8. A mechanical movement comprising a support, a thrust member on said support, superposed anti-friction units associated with said thrust member, one of said units arranged for rolling contact with said support, and means arranged to fulcrum upon the other of said units to propel said thrust member to and fro upon said support.

9. A support, a driven element on said support having contacting revoluble units and a driving element arranged to fulcrum upon one of said units to transfer its rolling motion to the other of said units and thereby propel said driven element to and fro upon said support.

10. A mechanical movement comprising a support, a driven element on said support, means associated with said driven element to propel same, and means tiltable with respect to the vertical axis of said propelling means to reciprocate said driven element upon said support.

11. A power producing mechanism comprising a support, a power producing element on said support, means associated with said power producing element to propel same, and means engaging said propelling means to reciprocate said element upon said support.

In testimony whereof I have set my hand.

OSCAR JOHNSON.